FIG. 1

INVENTOR.
WILLIAM C. HOWARD
BY
John F. Lubra
ATTORNEY

FIG. 2

INVENTOR.
WILLIAM C. HOWARD

INVENTOR.
WILLIAM C. HOWARD
BY
ATTORNEY

United States Patent Office 3,220,883
Patented Nov. 30, 1965

3,220,883
AUTOMATIC SEQUENTIAL CONTROL SYSTEM AND METHOD FOR SUGAR PAN OPERATION
William C. Howard, Decatur, Ga., assignor to Bailey Meter Company, a corporation of Delaware
Filed Oct. 1, 1962, Ser. No. 227,187
9 Claims. (Cl. 127—16)

This invention relates to apparatus for automatic sequential control of a batch process and more particularly to a process operated under a negative atmospheric pressure.

While not so limited this invention relates to the sequential control of vacuum pans in sugar refining, which as is well known to those skilled in the art operates under a negative atmospheric condition.

In the past such vacuum pans have been controlled by hand in a hit or miss, step by step procedure. This resulted in low yield per strike, considerable waste of time, and poor quality which resulted in considerable non-acceptable product.

Whenever the human element enters a control system there exists the chance of human error. The human error may not be as damaging as the "corrective measures" taken to correct this error. Complete sequential control of a system not only reduces the human element to a minimum, but completely prevents cover-ups of previous mistakes. I have found then that sequential operation results in more consistent strike quality.

I have also found that considerable time is lost between subsequent steps when reliance is placed on a human operator. In an experimental installation of this system the entire cycle from charging to dumping was completed in the record time of 47 minutes. When using automatic sequential control this time can be continually repeated thereby enabling precise scheduling of the entire refining operation.

In the course of vacuum pan operation different grades of sugar are often made in the same pan in subsequent cycles. Here again automatic sequential control has proven superior to prior methods. Timing, which is important in determining a particular grade, can be accurately set and repeated consistently. This time is set on time relays and does not rely on the memory of a human operator.

Since timing and charge concentration are critical to produce a successful strike, automatic control is required. It is then an object of this invention to provide an automatic sequential control for both timing and concentration.

It is a further object of this invention to provide a sequential control system that gives consistent sugar quality and quantity in the shortest time possible. Also, different grades of sugar can be produced with complete assurance of uniformity between subsequent strikes.

It is also an object of this invention to provide a method of sequentially controlling vacuum pans in sugar refineries. This method consisting of charging, evaporating, seeding, concentrating, dropping and washing the pan for a following cycle.

The objects and the advantages will become more apparent from the following description in connection with the accompanying drawings wherein.

Figure 1:
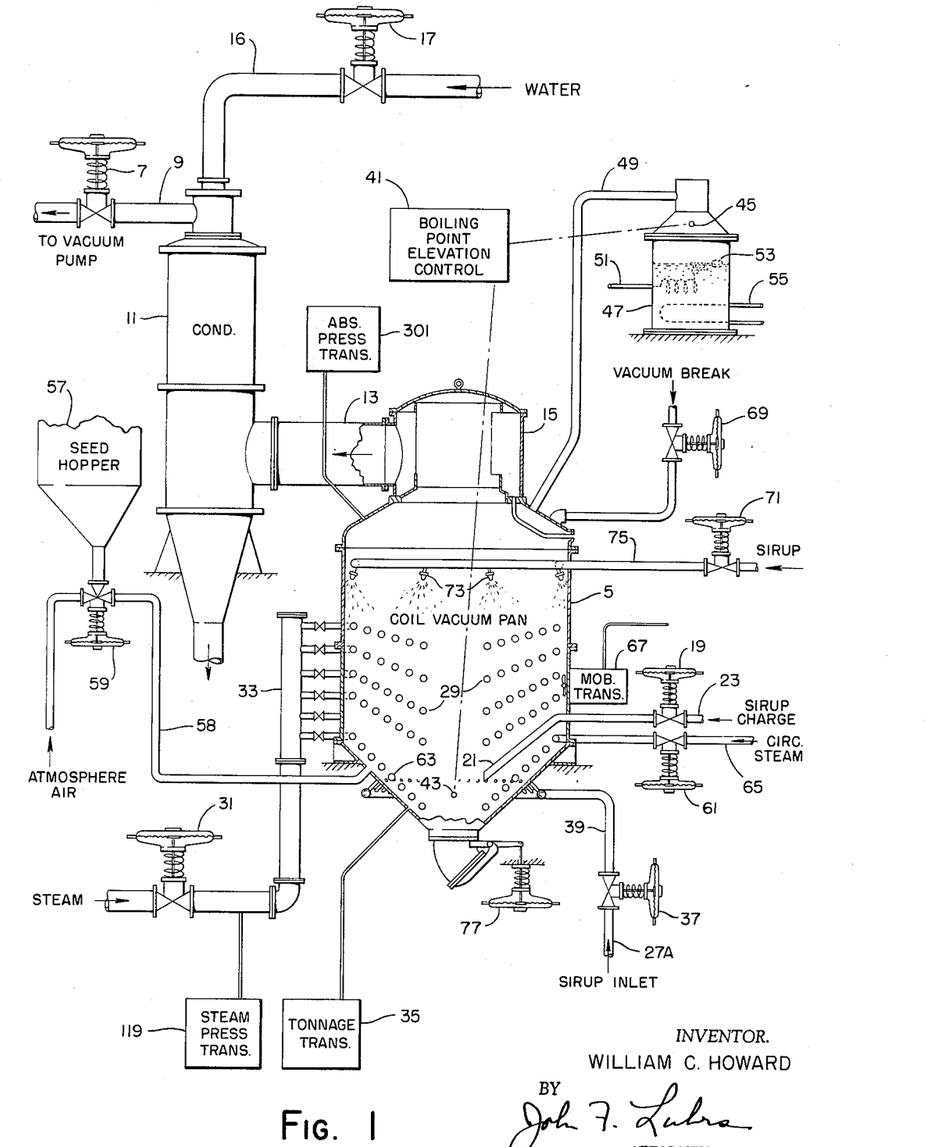
FIG. 1 is a schematic illustration of a vacuum pan with the associated valves and piping.
Figure 1A:
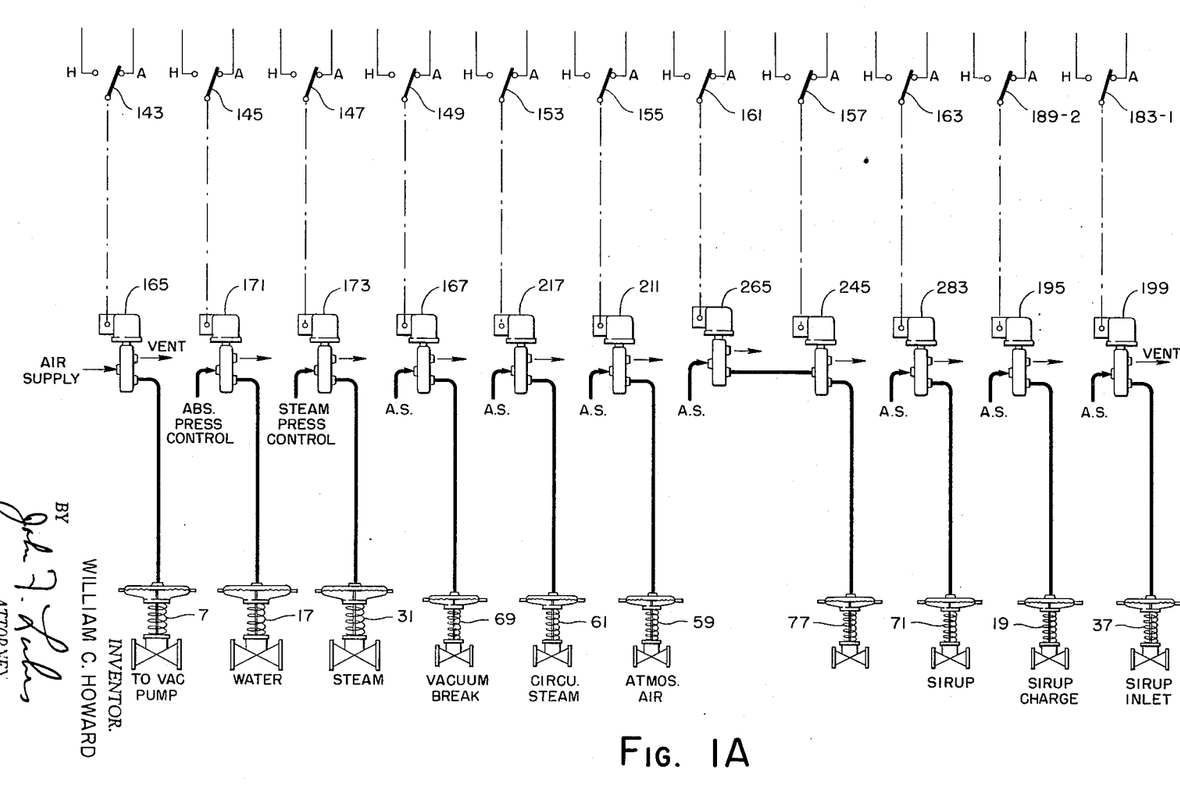
FIG. 1A is a schematic illustration showing the connection of the automatic sequential control to the associated control elements on the vacuum pan.
Figure 3:
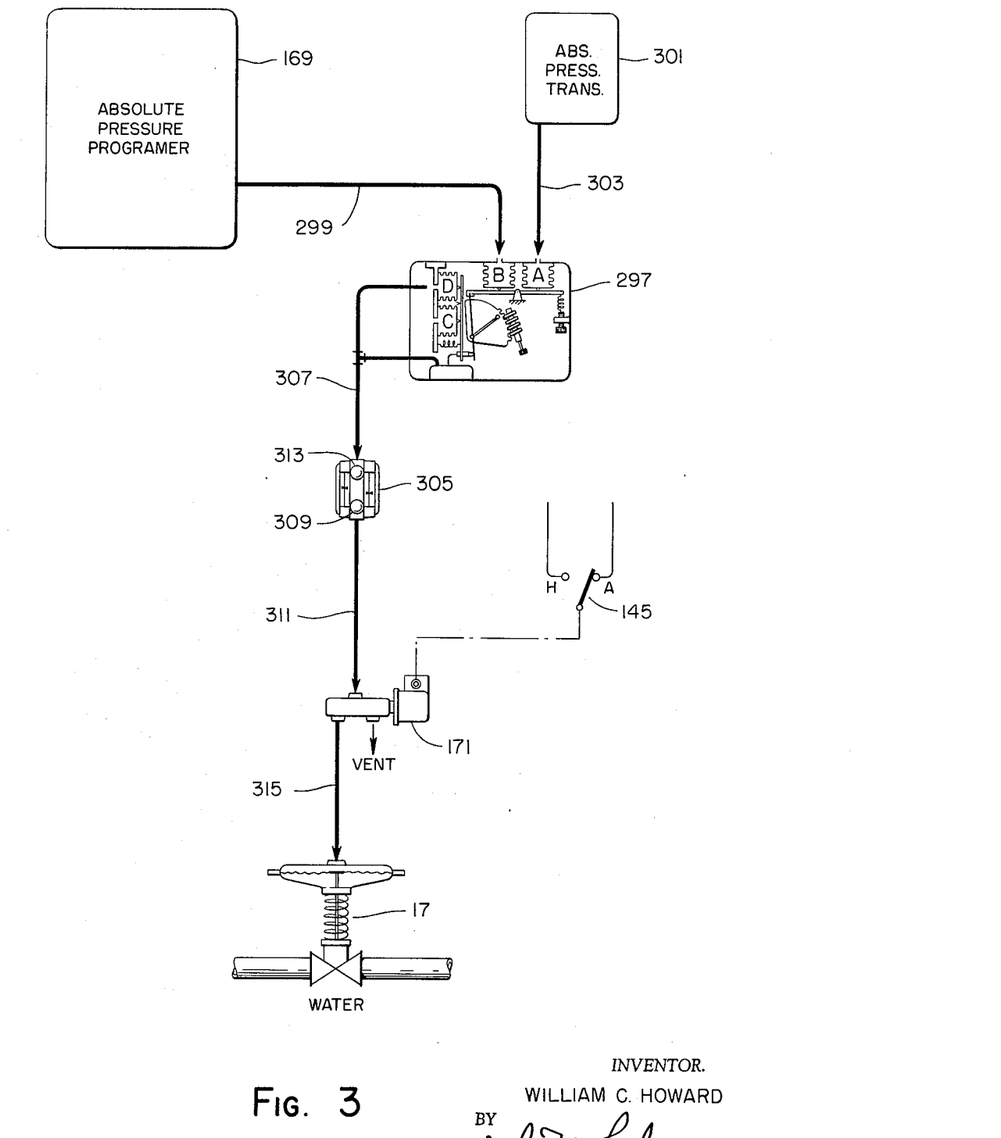
FIG. 3 is a schematic illustration of a typical absolute pressure control system for the vacuum pan of FIG. 1.

Referring to FIG. 1, I show a vacuum pan 5, the construction of which is well known to those skilled in the art. In operation the vacuum pan 5 is closed and evacuated by means of a vacuum control valve 7, from a vacuum source (not shown) acting through a pipe 9, condenser 11, vapor pipe 13 and catchall 15. The condenser 11, which may be any one of several types, I have shown as a jet or barometric condenser supplied with cold water by means of a pipe 16 and controlled by a water control valve 17, and serves the purpose of condensing the vapors thus assisting in controlling the absolute pressure. Throughout the strike the absolute pressure in the vacuum pan 5 is controlled at predetermined levels by varying the flow of water through the condenser 11. It is the function of the vacuum control system as shown in FIG. 3 and an absolute pressure programmer to establish and control the various required levels of absolute pressure. This system will be described later in reference to FIG. 3. The catchall 15, at the top of the vacuum pan 5, serves the purpose of slowing down the sirup vapors, thereby reducing entrainment of sirups to a minimum.

At the start of a strike, valve 7 is opened and the absolute pressure in the vacuum pan 5 decreases until it is sufficient to draw a charge, at which time a charge valve 19, which is connected to an internal feed pipe 21 by means of pipe 23, is opened. Enough sirup is drawn from a storage tank (not shown) through pipe 23 to cover the steam coils 29. The amount of this charge is determined and controlled by a tonnage transmitter 35. This transmitter can be any one of a number of different types. The only requisite being that it is capable of actuating two micro-switches at different settings corresponding to two different weights of the charge in the vacuum pan 5. Steam is now applied to the steam coils 29 and the steam pressure controlled by a pressure control valve 31 which is connected to the steam coils 29 by means of a pipe 33.

With steam applied to the steam coils 29 evaporation of the sirup proceeds very rapidly and the level of the sirup in the vacuum pan 5 decreases. Additional sirup must be drawn in to maintain the level in the pan above the steam coils 29. This additional sirup is drawn in through the charge control valve 37, connected to a charge storage tank (not shown) by means of pipe 27A. Evaporation continues and the supersaturation of the charge is continually determined by measuring its boiling point elevation (B.P.E.) by means of a recorder-controller 41. This boiling point recorder may, for example, be of the type illustrated and described in United States Patent 2,263,847, issued to Alfred L. Holven. Basically Holven shows that the degree of supersaturation of a sugar solution is equivalent to the ratio of the difference between the boiling point of water and a reference temperature, and the boiling point of the sugar solution and a reference temperature, when both are boiling at the same absolute pressure. Expressed as a formula:

$$\frac{T_w - K}{T_s - K} = \tan \theta$$

Where $T_w$ is the boiling temperature of water, $T_s$ is the boiling temperature of the sugar solution, and $K$ is a reference temperature. The temperature of the boiling solution is measured by a temperature element 43 located in the lower section of the vacuum pan 5. The temperature of boiling water at the same absolute pressure is by a similar element 45 mounted in the hood of a so-called pilot pan 47. A complete description of the operation of the pilot pan is given in United States Patent 2,135,512, issued to Alfred L. Holven. Briefly, water enters the pilot pan 47 through a pipe 51 and controlled to a pre-set level by a float control 53. A heating element 55 boils the water causing vapors which are measured by temperature element 45. By connecting a vapor pipe 49 to the vacuum pan 5 both are maintained at the same absolute pressure.

After the B.P.E. reaches 8° C. the charge is seeded by means of a seeding hopper 57 connected to the vacuum pan 5 by means of a pipe 58, and controlled by a seed control valve 59. I have chosen 8° C. as a point for beginning the seeding operation for illustrative purposes not intending to limit my invention to only this value as other values could be chosen depending on the surrounding circumstances. Several methods of seeding are practiced in the industry one being known as "shock seeding." This consists of concentrating the mass in the vacuum pan to above saturation and then drawing into the pan a small quantity (a pound or so) of uniform sugar crystals. Theoretically, the shock seeding should be applied as soon as saturation has been attained, this results in very regular grains if the method is otherwise properly employed.

Concurrently with the seeding operation a circulating valve 61 is opened allowing steam to enter the circulating coil 63 by means of pipe 65. One of the most important characteristics of vacuum pan operation, which determines the quality of the sugar, is good circulation as is well known to those skilled in the art.

During the entire evaporation and seeding cycle a mobility transmitter 67 monitors the viscosity of the sirup preventing the viscosity from advancing beyond desirable limits by automatically admitting additional feed sirup. This mobility transmitter 67 may be any one of a number of different types so long as the output is proportional to the viscosity of the fluid. After the grain has been secured the concentration must be brought back to a metastable or crystal growing phase where it must remain during the duration of the strike. If at any time the concentration goes too high, new unwanted crystals will form. These are called false grain or smear and they must be dissolved by dilution with additional sirup. It is the function of the mobility transmitter 67 in conjunction with the absolute pressure control system to control the crystal growing operation and prevent false grains.

When the volume of the massecuite has grown to the final capacity of the vacuum pan 5 the final concentration is arrived at by closing the charge control valve 37 and the pressure control valve 31 and allowing evaporation to proceed until the proper gravity measured in degrees Brix is attained. At this time the vacuum is released by means of a vacuum break valve 69 after the vacuum control valve 7 is closed. The strike is then dropped to the mixer through a foot valve 77.

Before beginning a subsequent batch the massecuite adhering to the pan walls and steam coils must be flushed away. This washing is completed by opening the wash control valve 71 which is connected to a series of nozzles 73 by means of a pipe 75. Usually clean feed sirup is used for this washing operation and the small amount required can be dropped to the same mixer as the strike or returned to sirup feed tanks. The foot valve 77 is now closed and the system ready for another cycle.

Figure 2:
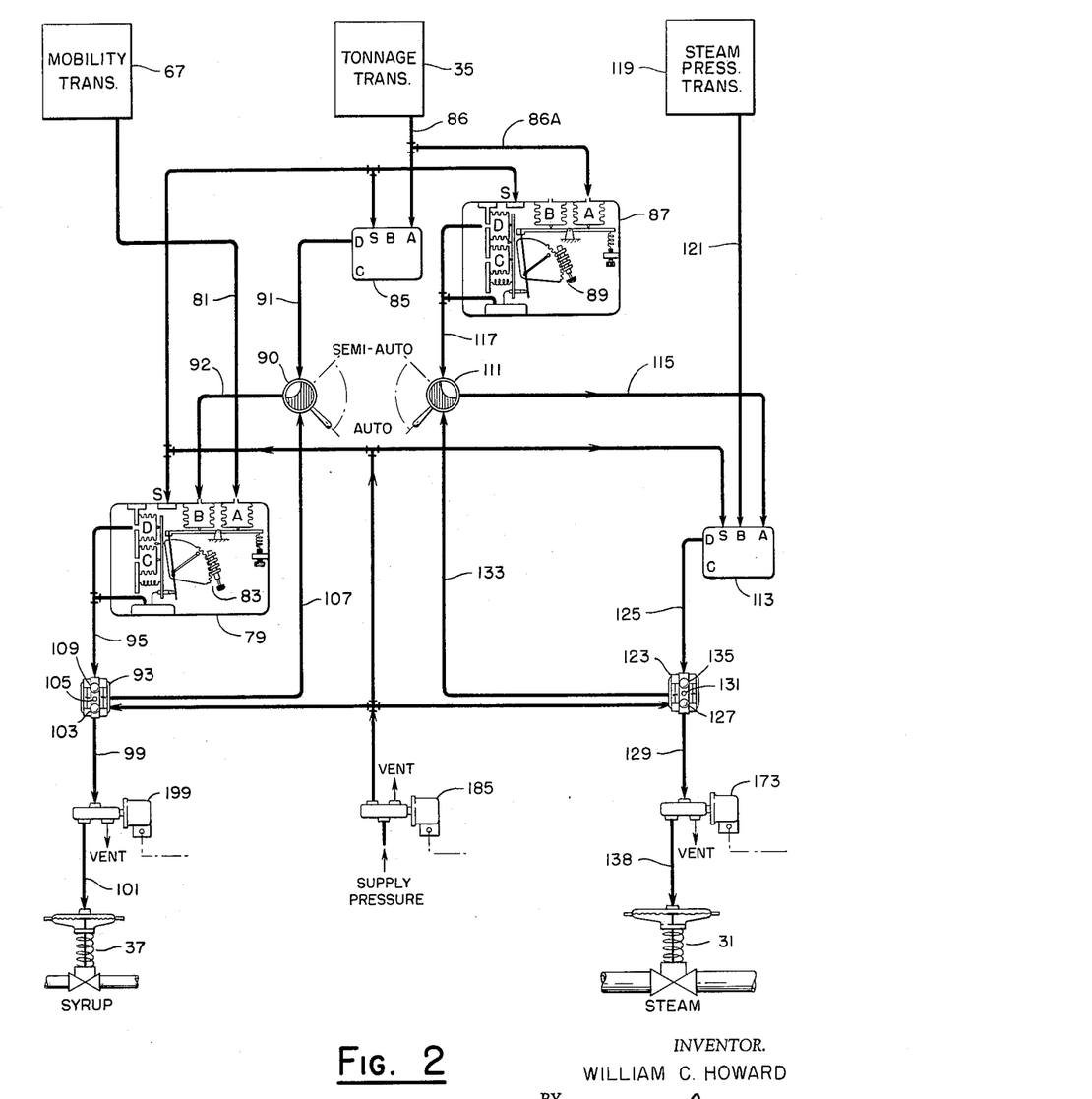
FIG. 2 is a schematic illustration of a typical cascade control system for controlling the charging and evaporation rates, maintaining proper relationship between tonnage, heater surface temperature, and viscosity of pan contents.

Referring now to FIG. 2, I show a cascade control system for controlling the sirup flow and steam pressure. As was discussed previously, if the concentration of the charge reaches a certain point unwanted crystals will form. Also the level of the charge in the vacuum chamber 5 must be maintained to assure coverage of the steam coils 29 at all times during evaporation. If the steam coils 29 are not continually covered the sirup adhering to these surfaces will caramelize. Caramelization reduces the evaporation rate and causes poor strike quality. It is important that both the charge viscosity, level, and heater surface temperature be maintained in the cascade control system of FIG. 2 to maintain these values in proper relationship.

Turning now to a consideration of the cascade control, I illustrate a system of the pneumatically operated type for the reason that the components of such type are well known and understood in the art. However, I could equally as well use for illustrative purposes an electrically or hydraulically operated control system as will be readily appreciated as the description proceeds.

To control the charge viscosity the output of the mobility transmitter 67 is transmitted to port A of a relay 79. Control of the level is a function of the tonnage transmitter 35, the output of which is transmitted to the A port of relay 85 through a pipe 86 and to the A port of relay 87 through pipe 86A. In relay 85 and 87 the B port is opened to the atmosphere and the loading pressure at port D varies in accordance with the pressure at port A. The output of relay 85 is transmitted to a three-way valve 90 via pipe 91, the need for this valve will be discussed more fully below. With the three-way valve 90 set in the automatic position, as shown, the loading pressure from relay 85 is transmitted to the B port of relay 79 through a pipe 92.

Relays 79, 85 and 87 may, for example, be of a type illustrated and described in United States Patent 2,805,-678, issued to Michael Panich on September 10, 1957. Relay 79, which has a pressure applied at both the A and B ports, is known in the art as a differential controller. It has an adjustment 83 which provides for adjusting the ratio between the A–B differential and the resulting change at port D. Relays 85 and 87 have the B port open to the atmosphere and the pressure at port D varies in direct proportion to variations in the pressure at port A. These relays are supplied with an adjustment 89 similar to the adjustment 83, to vary the ratio between the pressures at port A and port D. Relays 85 and 87 are known to those skilled in the art as proportional controllers.

Returning now to consideration of the control system, since relay 79 is of the differential type the pressure at port D will be proportional to the difference between the signal from the mobility transmitter 67 and the relay 85. This loading pressure from port D, of relay 79, is transmitted to the set-point selector station 93 via pipe 95. From selector station 93 the loading pressure is further transmitted to solenoid valve 199 through pipe 99. Finally the loading pressure is transmitted from the solenoid valve 199 to the charge control valve 37 through a pipe 101. During the evaporation of the batch the solenoid, of solenoid valve 199 is energized, this creates a through passage to the charge control valve 37. When the strike is complete and dropped to the mixer solenoid valve 199 is de-energized and the loading pressure from relay 79 is blocked and prevented from positioning the charge control valve 37. In addition the solenoid valve 199 vents the control valve 37 to the atmosphere when the solenoid is de-energized. The charge control valve 37 is of a type that requires air to open, therefore when the operator is vented to the atmosphere the valve 37 is closed.

Set-point selector station 93 and other selector stations in the control system may be of the type illustrated and described in the Panich Patent 2,805,678 and afford a means for transferring the control from automatic to remote manual. There is a knob 103 by which the control pressure in pipe 99 may be manually adjusted with the station in manual position. With the station in the semi-automatic position a set-point pressure is established by a knob 105 which is transmitted through a pipe 107 to the three-way valve 90. With the three-way valve 90 turned to the semi-automatic position the signal is further transmitted to the port B of relay 79 against which the loading pressure from the mobility transmitter 67 is now balanced, accordingly the level of the sirup in the vacuum pan 5 may be maintained by the tonnage transmitter 35 when the three-way valve 90 is in the automatic position shown, or when turned to the semi-automatic position by the set point from selector station 93. The selector station 93 is also provided with a pneumatic switch 109 for transferring the control from the loading pressure in pipe 99 to the loading pressure established by turning knob 103.

The tonnage transmitter 35 in effect automatically adjusts the set point of the mobility control system and of a steam pressure control system now to be described.

As evaporation of the sirup proceeds and the viscosity of the mass increases additional heat is required to maintain maximum evaporation rate. The additional heat required is obtained by increasing the steam pressure to the steam coils 29. The steam pressure is increased as the signal from the tonnage transmitter 35 increases. As shown the output of the tonnage transmitter 35 is transmitted to relay 87 through pipe 86A. The output of relay 87 is transmitted to a three-way valve 111 via pipe 117. Three-way valve 111 is identical to three-way valve 90 in construction and function. From the three-way valve 111 the loading pressure is transmitted to the A port of relay 113 through pipe 115. Relay 113 is identical to relay 79.

In this pressure control system, as in the mobility control system, the signal from the tonnage transmitter 35 is the primary control. Steam pressure transmitter 119 monitors the steam coil pressure and develops an output signal proportional to this pressure. The output signal from the steam pressure transmitter 119 is transmitted to the B port of relay 113 through pipe 121. The output of relay 113 at port D is proportional to the difference between the pressures at the A–B ports. This signal is transmitted to the set-point selector station 123 through a pipe 125.

Set-point selector station 123 is identical to the set-point selector station 93. There is a knob 127 by which the control pressure in pipe 129 may be manually adjusted when switch 135 is in manual position. With the switch in semi-automatic position the set point, that is, the steam pressure maintained by the control, may be adjusted by knob 131. Knob 131 establishes a pressure in pipe 133 which is transmitted through this pipe to three-way valve 111. When the three-way valve 111 is in the semi-automatic position this signal is transmitted to the A port of relay 113. With the system in the automatic condition (as shown) the signal from relay 87 is transmitted to the A port of relay 113.

The loading pressure of the selector station 123 is transmitted through pipe 129 to a solenoid valve 173. Solenoid valve 173 is identical in construction and function to solenoid valve 199. If the solenoid is energized the loading pressure from selector station 123 is passed to the steam control valve 31 through a pipe 138. When the solenoid is de-energized, at the end of a cycle, the solenoid valve 173 blocks the loading pressure from the selector station 123 and vents the operator of valve 31 to atmosphere. Valve 31, having an air to open operator, closes when vented through the solenoid valve 173.

Considering the steam pressure control system in its entirety, as the tonnage transmitter 35 indicates a greater weight of sirup the steam pressure valve 137 proportionally opens. This increases the pressure on the steam coils 129 thereby increasing the heating effect and continues a maximum rate of evaporation. If the pressure in the steam coil varies the steam pressure transmitter 119 will give a correction signal and maintain the pressure established by the tonnage transmitter 35.

One additional system feature must be mentioned for a complete description, that is the control of supply pressure to the cascade control system by solenoid valve 185. Valve 185 completely shuts off the air supply to all elements of the cascade control system. Because both valves 37 and 31 have air to open operators, when the air supply pressure is shut off these valves close. It should be apparent that this is an additional system safety feature which eliminates the possibility of an erroneous charge or a hot vacuum pan for a subsequent charge.

Referring now to FIG. 3, I show a control system for controlling the absolute pressure in the vacuum pan 5. As stated earlier the absolute pressure is maintained at different predetermined levels throughout the cycle. Initially the absolute pressure is decreased from atmospheric at a predetermined rate until sufficient to draw a charge from the storage tank. During the evaporation phase the absolute pressure is maintained at another predetermined level. It has been found that during the evaporation a good standard of absolute pressure is 5 inches of mercury, this will give a graining point of 150° to 160° F. After the grain has been secured and the strike is being brought together still another absolute pressure level is required.

When the evaporation first begins the rate of evaporation is fast, due to the large quantities of water being released from the low density sirup. The absolute pressure in the vacuum pan 5 would increase very rapidly if not continually measured and controlled. Good vacuum control is also required when the strike is brought together. It is during this phase of the batch that automatic vacuum control is a near necessity. Here the level of absolute pressure controls the rate and uniformity of the crystal growth. If the crystals are allowed to grow too rapidly false grains or conglomerates will result. The damage of false grains or conglomerates would be done before an operator had time to apply a correction.

Turning now to a consideration of the system, I show an absolute pressure programmer 169. This programmer can be any one of a number of such controllers all of which are well known to those skilled in the art. The only requisite for my control system is that the output is a fluid pressure signal proportional to the level of absolute pressure desired. From the absolute pressure programmer 169 the established setpoint signal is transmitted to the B port of relay 297 through a pipe 299. For continual control the absolute pressure in the vacuum pan 5 is measured by absolute pressure transmitter 301. This transmitter transmits a fluid pressure output signal proportional to the asbolute pressure in the pan. The control signal from pressure transmitter 301 is transmitted to the A port of relay 297 through a pipe 303.

Relay 297 is similar to relays 79, 85 and 87 described with reference to FIG. 2. Relay 297, having a pressure signal applied to both the A and B ports, is known as a differential controller. The output of relay 297, at port D, is transmitted to the selector station 305 through pipe 307.

Selector station 305 is illustrated and described in United States Patent 2,805,678, issued to Michael Panich, and affords a means for transferring the control from automatic to remote manual. Thus there is a knob 309 by which the control pressure in pipe 311 may be manually adjusted with the station in manual position. The selector station 305 is also provided with a pneumatic switch 313 for transferring the control from automatic to remote manual and vice versa.

From selector station 305 the signal is transmitted to a solenoid valve 171 through pipe 315. With the solenoid valve 171 energized the control pressure is transmitted to the operator of the water control valve 17 through a pipe 315.

It is apparent that as the evaporation proceeds through its various stages the absolute pressure standard is set by the absolute pressure programmer 169 and the position of valve 171 adjusted until the actual absolute pressure as measured by transmitter 301 is equal to the standard.

Figure 4A:
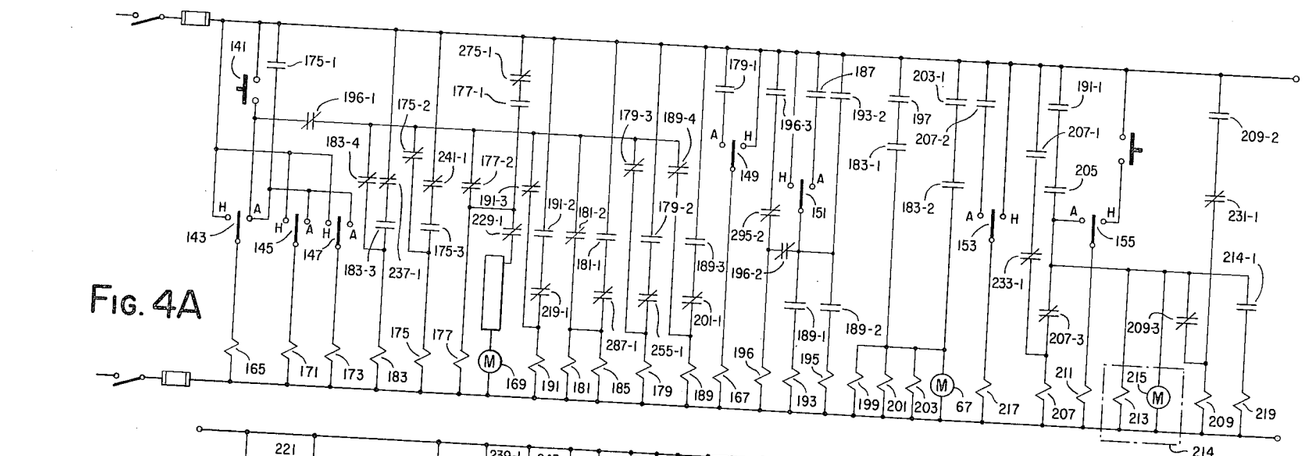
FIG. 4A and FIG. 4B are schematic wiring diagrams of the sequential control system.
Figure 4B:
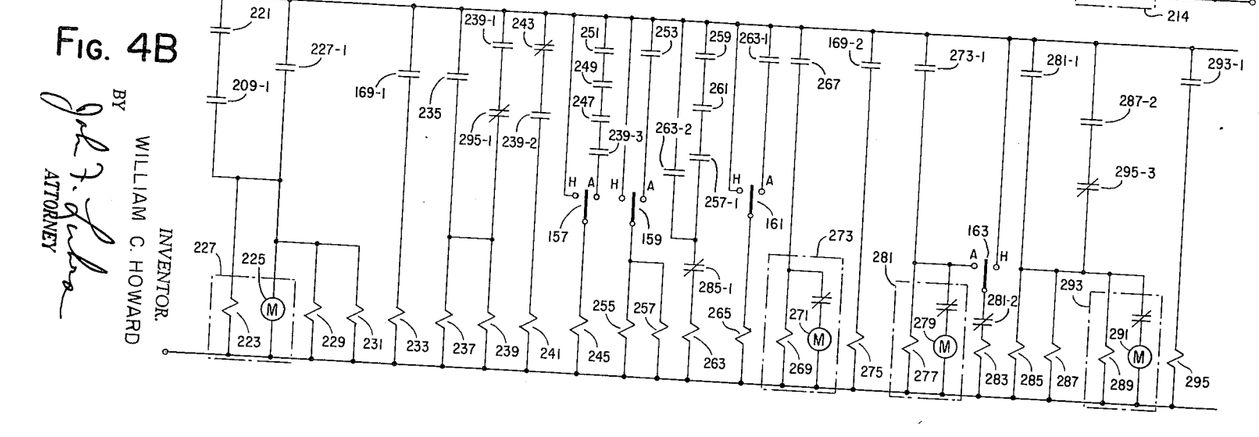

Referring now to FIGS. 4A and B, I show a sequential control system for tne vacuum pan 5 of FIG. 1. The great value of automatic control is that it eliminates the personal equation, substituting definite steps for the sense of touch of the sugar boiler. The only human operation required in my sequential control is the pushing of pushbutton 141.

An objection often expressed, against complete automatic control, is that when the control system is down for repairs all production must stop. This possibility has been eliminated by providing hand-automatic switches 143, 145, 147, 149, 151, 153, 155, 157, 159, 161 and 163. To operate the vacuum pan 5 on hand these switches are turned to the hand or H position as shown in the drawing. For complete automatic operation, which I will presently described, these same switches are placed in automatic or A position as shown in the drawing.

With switches 143–163 in the automatic position the sequence of vacuum pan 5 operation proceeds as follows. Pushing pushbutton 141 completes a circuit to solenoid valve 165 thereby opening the vacuum control valve 7 which causes a vacuum to be applied to the vacuum pan 5. Pushbutton 141 also completes a circuit to solenoid valve 171 thereby admitting a control signal to water control valve 17 which controls cooling water to the condenser 11. A circuit is also completed whereby solenoid valve 173 is energized thereby permitting operation of steam control valve 31 from the loading pressure of selector station 123. Simultaneously with the above operation hold-in relays 175, 177, 179, 181, 183, 189 and 191 are energized. Relay 175, having two normally open contacts and one normally closed contact, one set being make before break, holds in solenoid valves 165, 171 and 173 after the pushbutton 141 has been released. Relay 175 holds these solenoid valves energized by closing contact 175–1, it holds itself energized by closing contact 175–3 and isolates itself from random signals by opening contact 175–2. Relay 177, with one normally open and one normally closed contact, make before break, starts the absolute pressure programmer 169 and holds itself energized by closing contact 177–1, it further isolates itself by opening contact 177–2. Relay 179, having two normally open and one normally closed contacts, one set being make before break, closes contact 179–1 thereby energizing solenoid valve 167 which closes the vacuum break valve 69 thereby sealing the vacuum pan 5 from atmospheric pressure. Relay 179 holds itself energized by closing contact 179–2. Relay 179 isolates itself from random signals by opening contact 179–3. Relay 181, having one normally open and one normally closed contact, make before break, closes contact 181–1 thereby energizing solenoid valve 185 and holding itself energized with the same contact. Energizing solenoid valve 185 pressurizes the cascade control system of FIG. 2 with fluid air pressure. In addition relay 181 isolates itself from random signals by opening contact 181–2. Relay 183, having three normally open and one normally closed contacts, one set being make before break, closes contacts 183–1 and 183–2 thereby setting up a future sequential operation. This relay also holds itself energized by closing contact 183–3 and isolates itself by opening contact 183–4. Relay 189, with three normally open and one normally closed contacts, one set being make before break, closes contacts 189–1 and 189–2 in preparation for a future operation. Relay 189 holds itself energized by closing contact 189–3 and isolates itself by opening contact 189–4. Relay 191, with one normally open and one normally closed contacts, one set being make before break, closes contact 191–1 for a future sequential step. This relay holds itself energized by closing contact 191–2 and isolates itself by opening contact 191–3.

The absolute pressure programmer 169 now takes over control and commences to program the absolute pressure setpoint at a predetermined rate thereby gradually decreasing the absolute pressure in the vacuum pan 5. When the absolute pressure reaches a predetermined level, sufficient to draw in a sirup charge, an adjustable vacuum switch 187 closes. By closing contact 187 relay 193 is energized through previously closed contact 189–1. Relay 193, having one normally open contact, causes solenoid valve 195 to be energized by closing contact 193–1. Energizing solenoid valve 195 opens the charge valve 19 allowing sirup to be drawn into the vacuum pan 5. Closing contact 187 also energizes relay 196, which has one normally open and two normally closed contacts, one set being make before break. Energizing relay 196 open contact 196–1 thereby allowing relays 183, 175, 177, 191, 181, 179 and 189 to be de-energized and reset tin their proper sequential order. Opening contact 196–1 also prevents false starts during one cycle by isolating pushbuttons 41 from the above mentioned relays. Relay 196 holds itself energized by closing contact 196–3 and isolates itself from contact 187 by opening contact 196–2.

As explained with reference to FIG. 1 the sirup is drawn into the vacuum pan 5 until the steam coils 29 are covered. When the charging is complete, as determined by the tonnage transmitter 35, a pressure switch 197, actuated by the tonnage transmitter, is closed. Closing switch 197 results in energizing solenoid valve 199, mobility transmitter 67, and relays 201 and 203. Relay 201 has one normally closed contact 201–1 which now opens. Opening contact 201–1 de-energizes relay 189 which in turn opens contacts 189–1, 189–2 and 189–3 and closes contact 189–4. Opening contact 189–1 prevents relay 193 from being energized, should switch 197 close during a later portion of the cycle. With contacts 189–2 and 201–1 open solenoid valve 195 cannot be energized thereby locking the charge valve 19 closed. Relay 203, having one normally open contact, holds solenoid valve 199, relay 201, mobility transmitter 67 and itself energized by closing contact 203–1 when switch 197 opens. This relay will remain energized during the remainder of the cycle. Energizing solenoid valve 199 opens the operator of the charge control valve 37 to the loading pressure of selector station 93. The charge control valve 37 now controls the flow of sirup to the vacuum pan 5 thereby automatically replacing tonnage losses, due to water evaporation, with additional feed sirup whose rate of admission is governed by mobility transmitter 67. This provides maximum yield from the pan without exceeding the safe limits of viscosity as described with reference to FIG. 2.

Coincidently with this operation, the tonnage transmitter 35 opens the steam control valve 31 thereby causing steam pressure to be built up in the steam coils 29. Evaporation of the charge proceeds at a maximum rate as controlled by the cascade control system shown in FIG. 2. Evaporation continues until the supersaturation of the charge reaches a B.P.E. of 8° C. as measured by the boiling point recorder 41. When the B.P.E. reaches 8° C. a contact 203, mounted in the boiling point elevation recorder-controller 41, is closed. Closing contact 203, in conjunction with the already closed contact 191–1, results in energizing relays 207 and 209, also energized are the clutch coil 213, and the motor 215 of the time delay relay 214, and solenoid valve 211. Relay 207, having two normally open and one normally closed contacts, one set being make before break, holds itself energized by closing contact 207–1 and isolates itself from other circuits by opening contact 207–3. Relay 207 also energizes solenoid valve 217 by closing contact 207–2. Solenoid valve 217 opens the circulating valve 61 thereby permitting live steam to enter the vacuum pan 5 through the circulating coil 63. Relay 209, also with two normally open and one normally closed contacts, one set being make before break, closes contact 209–1 for a future operation. This relay holds itself energized by closing contact 209–2 and isolates itself by opening contact 209–3.

Energizing solenoid valve 211 opens the seeding hopper 57 for seeding the charge at that point in the evaporation cycle when grains are most easily formed. Seeding will continue as long as solenoid valve 211 is energized, this being controlled by the time delay relay 214. When the clutch coil 213 is energized it positions several contacts within relay 214 so that after the motor 215 has run its pre-set time contact 214–1 will close. Closing contact 214–1 causes relay 219, which has one normally closed contact 219–1, to be energized. When contact 219–1 opens it disconnects and de-energizes relay 191. Relay 191 controls contacts 191–1, 191–2, and 191–3. Contact 191–2, being a normally open contact, merely causes a second disconnect in the line to relay 191. Contact 191–3, being a normally closed contact, resets relay 191 to receive a start signal in a subsequent charge. Contact 191–1, being a normally open contact, de-energizes solenoid valve 211, clutch coil 213, motor 215, and relay 219. De-energizing clutch coil 213 and motor 215 resets the time delay relay 214 for a subsequent strike. De-energizing relay 219 closes contact 219–1 resetting relay 191 for a subsequent operation. De-energizing solenoid valve 211 stops the batch seeding.

As solenoid valve 211 closes it operates a microswitch 221 which completes a circuit thereby energizing clutch coil 223 and motor 225 of the time delay relay 227, also energized are relays 229 and 231. Energizing clutch coil 223 closes contact 227–1, which remains closed until motor 225 has run its pre-set time. Relay 229, having one normally closed contact, disconnects and stops the absolute pressure programmer 169. Relay 231, having one normally closed contact, opens contact 231–1 thereby de-energizing relay 209 which in turn opens contacts 209–1, 209–2 and closes contact 209–3. Contact 209–2 is an additional disconnect in the line of relay 209, contact 209–3 resets relay 209 for a succeeding charge. Contact 209–1 opens one of the two parallel lines holding in the clutch coil 223, motor 225, relay 229 and relay 231. These four elements remain energized through contact 227–1.

After a pre-set time the time delay relay 227 opens contact 227–1 thereby de-energizing the clutch coil 223, motor 225, relay 229 and relay 231. De-energizing the clutch coil 223 resets the time delay relay 227 for the next strike. De-energizing relay 229 closes contact 229–1 thereby restarting the absolute pressure programmer 169. De-energizing relay 231 closes contact 231–1 resetting relay 209 for the following strike.

At a pre-set time after restarting the absolute pressure programmer 169 contact 169–1, mounted on the time disc of the programmer, closes and relay 233 is energized. Relay 233, having one normally closed contact, opens contact 233–1 which disconnects relay 207 causing it to be de-energized. De-energizing relay 207 opens contact 207–1 and 207–2 and closes contact 207–3. Opening contact 207–1 prevents relay 207 from being energized when contact 233–1 returns to its normally closed position. Opening contact 207–2 disconnects solenoid valve 217 which closes the circulating steam valve 61. Closing contact 207–3 resets relay 207 for a subsequent strike.

After the grain has been secured by seeding the evaporation continues, additional sirup being added to replace water evaporated, until the volume and weight of the massecuite has grown to the full capacity of the vacuum pan 5. This is determined by closing contact 235 which is actuated by the tonnage transmitter 35. Closing contact 235 causes relays 237 and 239 to be energized. Relay 237, having one normally closed contact, disconnects relay 183 by opening contact 237–1. De-energizing relay 183 opens contacts 183–1, 183–2, and 183–3 and closes contact 183–4. Opening contact 183–3 and closing 183–4 resets relay 183 for the next batch. Opening contact 183–1 and 183–2 disconnects solenoid valve 199 thereby disconnecting the charge control valve 37 from the loading pressure of selector station 93. The pneumatic operator of the charge control valve 37 is vented to the atmosphere and being an air to open operator it stops the sirup flow to the vacuum pan 5. De-energizing relay 203 opens contact 201–1, which prevents re-energizing solenoid valve 199, relay 201, relay 203 and mobility transmitter 67, until the proper sequence in the following cycle. Energizing relay 239, having three normally open contacts, closes contacts 239–1, 239–2 and 239–3. Contact 239–1 completes a circuit parallel to the circuit of contact 235, therefore when contact 235 opens relay 237 and 239 will remain energized. Contact 239–2 is one of two contacts that must be closed to energized relay 241. Relay 241 will not be energized until both contacts 239–2 and 243 are closed. Contact 239–3 is one of four contacts that must close to energize solenoid valve 245.

As the flow of steam through the steam control valve 31 decreases, at the end of the evaporation and crystal growing phase, contact 243 is closed. Depending on the particular setting of steam flow, contact 243 could close prior to or subsequent to the closing of contact 239–2. After both contacts 249 and 239–2 are closed relay 241 is energized. Relay 241, having one normally closed contact, disconnects relay 175 by opening contact 241–1. De-energizing relay 175 opens contacts 175–1 and 175–3 and closes contact 175–2. Opening contact 175–3 and closing contact 175–2 resets relay 175 for the next strike. Opening contact 175–1 de-energizes solenoid valves 165, 171 and 173 thereby closing the vacuum control valve 7, the pressure control valve 31, and the water condenser valve 17.

Closing the vacuum control valve 7 closes contact 247, closing the pressure control valve 31 closes contact 251, and closing the condenser water valve 17 closes contact 249. After all three contacts 247, 249 and 251 are closed solenoid valve 245 is energized through the previously closed contact 239–3. Solenoid valve 245 unlocks the foot valve 77 of the vacuum pan 5. After the foot valve 77 is proven unlocked a contact 253, mounted on the lock, is closed. When contact 253 is closed relays 255 and 257 are energized. Relay 257, having one normally open contact, closes contact 257–1 making it possible to energize solenoid valve 263 at a later sequential operation. Relay 255, having one normally closed contact, disconnects relay 179 by opening contact 255–1. Relay 179 opens contacts 179–1 and 179–2 and closes contact 179–3. Opening contact 179–2 and closing contact 179–3 resets relay 179 for the following cycle. Solenoid valve 167 is now de-energized by opening contact 179–1, thus opening the vacuum break valve 69. The vacuum pan 5 is vented to the atmosphere. As the absolute pressure in the pan increases to atmospheric pressure contact 257 is closed. The strike is now complete and ready to drop to a mixer.

If the mixer level is too high a level switch 261 will be in the open position and the foot valve 77 will be prevented from opening. As the level of the mixer drops, so the entire batch can be taken by the mixer, level switch 261 will close. At the closing of the level switch 261 relay 263 will be energized as contact 257–1 and 259 have been closed by previous action. Relay 263, having two normally open contacts, closes contact 263–1 thereby energizing solenoid valve 265. Relay 263 locks itself energized by closing contact 263–2. Energizing solenoid valve 265 opens the foot valve 77 thereby dropping the strike to the now empty mixer. As the level in the mixes rises the level switch 261 will open, the foot valve 77 is prevented from closing by self-locking contact 263–2 of relay 263.

As the foot valve 77 reaches its fully opened position contact 267, mounted on the valve, is closed thereby energizing the clutch coil 269 and the motor 271 of the time delay relay 273. Time delay relay 273 is set to run for the approximate drain time of the vacuum pan 5. After this pre-set time has run contact 273–1 is closed. At approximately this time, in the sequence, the absolute pressure programmer 169 has completed its rotation and closes contact 169–2, thereby energizing relay 275. Relay 275 has one normally closed contact 275–1 which now opens thereby de-energizing relay 177. De-energizing relay 177 resets the absolute pressure programmer 169 which again opens contact 169–2 de-energizing relay 275. De-energizing relay 177 also closes contact 177–2 and opens contact 177–1 which resets relay 177 for a subsequent strike. Closing contact 273–1, at the end of the timing cycle of time delay relay 273, also energizes the clutch coil 277, and motor 279 of time delay relay 281. Also energized by contact 273–1 is solenoid valve 283 which opens the wash control valve 71.

Washing the vacuum pan 5 continues until the time delay relay 281 has completed its timing cycle. Contact 281–1 is then closed and contact 281–2 is opened. Opening contact 281–2 causes solenoid valve 283 to be de-energized thereby closing the wash control valve 71. Closing contact 281–1 causes relays 285 and 287 to be energized, also energized is the clutch coil 289 and motor 291 of time delay relay 293. Relay 285, having one normally closed contact, de-energizes relay 263 by opening contact 285–1. De-energizing relay 263 opens contacts 263–1 and 263–2, contact 263–2 partially resets relay 263 for a future cycle. Opening contact 263–1 disconnects solenoid valve 265 which closes the foot valve 77. Relay 287 having one normally closed and one normally open contact disconnects relay 181 and solenoid valve 185 by opening contact 287–1, it further locks itself energized by closing contact 287–2. De-energizing solenoid valve 185 shuts off the air supply to the cascade control system. Time delay relay 293 is set for a period of time sufficient to allow the foot valve 77 to close. When this pre-set time has run contact 293–1 closes.

Closing contact 293–1 results in energizing relay 295, which has three normally closed contacts 295–1, 295–2, and 295–3. Opening contact 295–2 de-energizes relay 196 thereby closing contact 196–1 and 196–2 and opening contact 196–3. Closing contact 196–1 completes the resetting action of that group of relays initially energized by pushbutton 141. Closing contact 196–2 and opening contact 196–3 resets relay 196 for the next batch. Opening contact 295–1 disconnects relay 237 and 239. De-energizing relay 237 closes contact 237–1 which resets relay 183 for the following cycle. De-energizing relay 239 opens contacts 239–1, 239–2 and 239–3. Opening contact 239–1 resets relay 239. Opening contact 239–2 disconnects relay 241 which resets relay 175 for the following cycle by closing contact 241–1. Opening contact 239–3 results in de-energizing solenoid valve 245 which then locks the foot valve 77. Opening contact 295–3 resets the time delay relay 293 by disconnecting the clutch coil 289. Opening contact 295–3 also disconnects relays 285 and 287. De-energizing relay 285 closes contact 285–1 thereby resetting relay 263 for the following cycle. De-energizing relay 287 opens contact 287–2 and closes contact 287–1. Closing contact 287–1 resets relay 181 and opening contact 287–2 resets relay 287. Resetting the time delay relay 293 opens contact 293–1 de-energizing relay 295 completing the sequential cycle.

The sequential control is now complete with all valves and relays reset for the following cycle.

Referring now to FIGS. 1, 1A, 2, 3, 4A and 4B the following is a capsule summary of the complete operation. Pushbutton 141 having energized solenoid valves 165, 171 and 173, these in turn open the vacuum control valve 7, the water control valve 17, and unlock the pressure control valve 31. Also energized by pushbutton 141 are relays 183, 175, 177, 191, 181, 189 and 179. These in turn start the absolute pressure programmer 169, energize solenoid valve 167 thereby closing the vacuum break valve 69, and pressurize the cascade control system by opening the solenoid valve 185.

The absolute pressure in the vacuum pan 5 decreases and at a pre-set point the charge valve 19 is opened by energizing solenoid valve 195. Sirup is drawn into the pan from the storage tank until switch 187, actuated by the tonnage transmitter 35, closes. This starts the mobility transmitter 69, closes the charge valve 19 by de-energizing solenoid valve 195 and unlocks the charge control valve 37 by energizing solenoid valve 199.

Steam is now applied to the steam coils 29 and the evaporation of the sirup proceeds rapidly. As the evaporation proceeds the level of the charge must be maintained above the steam coils 29. The sirup level is controlled by the tonnage transmitter 35 in conjunction with the mobility transmitter 67 through the charge control valve 37.

As the volume of the charge is increased additional steam pressure is required to maintain maximum evaporation rates. The steam pressure is controlled by the tonnage transmitter 35 with correction from line pressure fluctuations by steam pressure transmitter 119. After saturation of the charge reaches a pre-set B.P.E. the seed control valve 59 is opened by energizing solenoid valve 211. The batch is seeded for a predetermined time, controlled by the time delay relay 214, from the seeding hopper 57. Very important during the seeding operation is proper circulation of the sirup. Additional circulation is assured by energizing solenoid valve 217 thereby opening the circulating valve 61 at the same time sequence as the seeding begins. When the time delay relay 214 has completed its time cycle time delay relay 227 is energized. Also the absolute pressure programmer 169 is stopped which closes the circulating valve 61 by de-energizing solenoid valve 217. The time delay relay 227 runs its pre-set time and is de-energized. The absolute pressure programmer is again energized.

After the seeding operation is complete the grain is allowed to grow with additional sirup added to replace evaporated water until the massecuite volume fills the vacuum pan 5. At such time switch 235, actuated by the tonnage transmitter 35 is closed. Solenoid valve 199 is de-energized thereby closing and locking the charge control valve 37. The mobility transmitter 67 is no longer required and is stopped.

When the steam flow through the steam coils 29 slows to a pre-determined value solenoid valves 165, 171 and 173 are de-energized. This closes the vacuum control valve 7 and the water control valve 17. This also closes and locks the pressure control valve 31. Closing these three valves results in energizing solenoid valve 245 which unlocks the foot valve 77. When the foot valve 77 is proven unlocked solenoid valve 167 is de-energized thereby opening the vacuum break valve 69.

The vacuum pan 5 now returns to atmospheric pressure and the strike is ready to drop. Foot valve 77 will not open until the mixer, into which the strike is scheduled, is sufficiently empty to receive the entire contents of the vacuum pan. When the proper mixer is ready the foot valve 77 is opened by energizing solenoid valve 265.

After a pre-set time, determined by time delay relay 273, the vacuum pan 5 is washed with feed sirup to remove all remaining massecuite. At the end of the pre-set time solenoid valve 283 is energized thereby opening the wash control valve 71. Washing continues for another pre-set time interval at which time solenoid valve 283 is de-energized by time delay relay 281. The foot valve 77 is now closed by de-energizing solenoid valve 265. When the foot valve 77 is fully closed solenoid valve 245 is de-energized and the sequential operation is complete. The vacuum pan 5 is ready for the following batch.

While only one embodiment of the invention has been herein shown and described, it will be apparent to those skilled in the art that many changes may be made in the construction and arrangement of parts without departing from the scope of the invention as defined in the appended claims.

What I claim as new, and desire to secure by Letters Patent of the United States is:

1. An automatic sequential control system for sugar pan operation, comprising in combination, a pushbutton for energizing said control system, means responsive to said pushbutton to activate said system control elements, an absolute pressure programmer for programming atmospheric conditions within said sugar pan after said control elements have been activated, a sirup charge valve for admitting sirup to said sugar pan after a preselected atmospheric condition has been established, a tonnage transmitter for controlling the amount of said sirup charge, means for controlling the rate of evaporation of said charge, a boiling point elevation transmitter for determining the saturation level of said charge during evaporation, a seed hopper and control valve for seeding said charge at a preselected saturation point, means for timing the duration of said seeding operation, means for determining the completion of crystal growth from said seeding operation, means for deactivating all system control elements after said crystal growth is complete, a dumping valve for transferring said crystal growth after all said control elements have been deactivated, locking means for preventing said transfer before certain preselected functions have been performed, spray nozzles and a control valve for washing residue crystals from said sugar pan to prevent contamination of a subsequent charge, means for timing said transfer and residue removal, and means for sequentially controlling all the above said means in proper sequential order.

2. An automatic sequential control system for sugar pan operation as claimed in claim 1, wherein said sequentially controlling means includes a series of interlocked relays connected in such circuitry so as to allow a subsequent operation when the present operation is complete and not before.

3. A method of automatically sequentially controlling the operation of a sugar pan, including the steps of, lowering the absolute pressure in the sugar pan in accordance with the demands of an absolute pressure programmer, drawing in a sirup charge at a preselected absolute pressure, measuring the amount of said charge throughout the sequential cycle, evaporating said sirup charge at a controlled rate of evaporation, measuring the saturation level during said evaporation, controlling the viscosity, level and temperature of said charge in proper relationship throughout said evaporation step, seeding said charge after it reaches a preselected saturation level, allowing the sugar crystal structure to grow after said seeding is complete, dumping the sugar crystals after said crystal growth is complete to a subsequent process, washing the residue crystals from the sugar pan after such transfer is complete, and preparing the sugar pan controls for a subsequent charge, all the above steps being performed in proper sequential order.

4. A sequential control system for a sugar pan, comprising, a pushbutton, a vacuum shut-off valve for connecting the sugar pan to a vacuum source, a condenser connected intermediate between said vacuum shut-off valve and said sugar pan for entrapping vapors emitting from said pan, a condenser water control valve for controlling the water through said condenser and in turn controlling the absolute pressure in said sugar pan, means for programming the absolute pressure in said sugar pan, a steam control valve for controlling the steam flow to said sugar pan, a steam and sirup control loop for controlling the rate of evaporation of a sirup charge, a vacuum break valve for releasing vacuum from said sugar pan upon completion of a strike, means responsive to said pushbutton for opening said vacuum shut-off valve, closing said vacuum break valve, connecting said condenser valve to said programming means and connecting said steam valve to said steam and sirup control loop, a charge valve for charging sirup to said sugar pan, means responsive to the absolute pressure in said sugar pan for opening said charge valve thereby filling said sugar pan with sirup, means responsive to the amount of sirup charged to said pan for closing said charge valve after a predetermined charge, a sirup control valve for maintaining the sirup charge in said sugar pan during the evaporation thereof, said control valve connected to said steam and sirup control loop when said charge valve closes, a boiling point elevation control for determining when the sirup charge has reached a supersaturation point, a seed control valve responsive to the boiling point elevation control for adding seed crystals to the sirup charge at the supersaturation point, means for determining when the volume and weight on the massecuite has grown to full capacity of said sugar pan, means responsive to said previous means for closing said vacuum shut-off valve, said steam control valve and said sirup control valve and for opening said vacuum break valve, a sugar pan discharge valve for dumping the massecuite from said sugar pan, and second means responsive to the absolute pressure in said sugar pan for opening said discharge valve at a preselected pressure in said pan.

5. A sequential control system for a sugar pan as set forth in claim 4 wherein said means responsive to the amount of sirup charge is a tonnage transmitter which is actuated by the weight of sirup in said sugar pan.

6. A sequential control system for a sugar pan, comprising, a pushbutton, a vacuum shut-off valve for connecting the sugar pan to a vacuum source, a condenser connected intermediate between said vacuum valve and said sugar pan for entrapping vapors emitting from said pan, a condenser water control valve for controlling the water through said condenser and in turn controlling the absolute pressure in said sugar pan, means for programming the absolute pressure in said sugar pan, a steam control valve controlling the steam flow to said sugar pan, a steam and sirup control loop for controlling the rate of evaporation of a sirup charge, a vacuum break valve for releasing vacuum from said sugar pan upon completion of a strike, means responsive to said pushputton for opening said vacuum shut-off valve, closing said vacuum break valve, connecting said condenser valve to said programming means and connecting said steam valve to said steam and sirup control loop, a charge valve for charging sirup to said sugar pan, an absolute pressure transmitter having a first switch responsive to one level of sugar pan pressure and a second switch responsive to a different sugar pan pressure, said first switch connected to open said charge valve, a tonnage transmitter having a first switch responsive to a given weight in said sugar pan and a second switch activated when the volume and weight of the massecuite has grown to full capacity, said first switch connected to close said charge valve, a sirup control valve for maintaining the sirup charge in said sugar pan during evaporation thereof, said control valve connected to said steam and sirup control loop by action of the first switch of said tonnnage transmitter, a boiling point elevation control for determining when the sirup charge has reached a supersaturation point, a seed control valve responsive to the boiling point elevation control for adding seed crystals to the sirup charge at the supersaturation point, timing means connected to close said seed control valve after a predetermined period, means responsive to the action of the second switch in said tonnage transmitter for closing said vacuum shutoff valve, said steam control valve and said sirup control valve and for opening the said vacuum break valve, and a sugar pan dumping valve for dumping the massecuite from said sugar pan, said dumping valve opened by the action of the second switch in said absolute pressure transmitter.

7. A sequential control system for a sugar pan as set forth in claim 6 including a steam circulating valve for applying steam to the sirup charge for proper circulation thereof.

8. A sequential control system for a sugar pan as set forth in claim 7 including means responsive to said boiling point controller for opening said circulation steam valve at the commencement of the seeding operation.

9. A sequential control system for a sugar pan, comprising, a pushbutton, a vacuum shut-off valve for connecting a sugar pan to a vacuum source, a condenser connected intermediate between said vacuum valve and said sugar pan for entrapping vapors emitting from said pan, a condenser water control valve for controlling the water through said condenser and in turn controlling the absolute pressure in said sugar pan, means for programming the absolute pressure in said sugar pan, a steam control valve for controlling the steam flow to said sugar pan, a steam and sirup control loop for controlling the rate of evaporation of a sirup charge, a vacuum break valve for releasing vacuum from said sugar pan upon completion of a strike, a plurality of solenoid valves energized by said pushbutton, one of said solenoids connected to open said vacuum valve, a second solenoid connected to close said vacuum break valve, a third solenoid when energized connects said condenser water valve to said absolute pressure controller, a fourth solenoid valve when energized connects said steam control valve to said steam and sirup control loop, a charge valve for charging sirup to said sugar pan, an absolute pressure transmitter having a first switch responsive to one level of sugar pan pressure and a second switch responsive to a different sugar pan pressure, said first switch connected to open said charge valve, a tonnage transmitter having a first switch responsive to a given weight in said sugar pan and a second switch actuated when the volume and weight of the massecuite has grown to full capacity, said first switch connected to close said charge valve, a sirup control valve for maintaining the sirup charge in said sugar pan during evaporation thereof, said control valve connected to said steam and sirup control loop by action of the first switch of said tonnage transmitter, a boiling point elevation control for determining when the sirup charge has reached a supersaturation point, a seed control valve responsive to the boiling point elevation control for adding seed crystals to the sirup charge at the supersaturation point, a steam circulating valve for applying steam to the sirup charge for circulation of the sirup during the crystal growing stage, means responsive to said boiling point controller for opening said circulating steam valve at the commencement of the seeding operation, timing means connected to close said seed control valve after a predetermined period, means responsive to the action of the second switch in said tonnage transmitter for de-energizing the solenoid to said vacuum shut-off valve, said vacuum break valve, said water condenser valve and said steam control valve, a sugar pan dumping valve for dumping the massecuite from said sugar pan, said dumping valve opened by the action of the second switch in said absolute pressure transmitter, a wash valve connected to spray nozzles in said sugar pan for washing said pan after the dumping valve has emptied the previous charge, and a second timing means actuated by the opening of said dumping valve for opening said wash valve a predetermined time after said dumping operation has commenced, said timing means closing said wash valve a preset time after opening thereof.

References Cited by the Examiner
UNITED STATES PATENTS 2,073,825   3/1937   Beck et al. _________ 127—16 X

OTHER REFERENCES

Hall: Automatic Vacuum Pan Control, Food Engineering, October 1955, pages 69–71.

MORRIS O. WOLK, *Primary Examiner.*